(12) United States Patent
Gaessler et al.

(10) Patent No.: US 6,651,624 B2
(45) Date of Patent: Nov. 25, 2003

(54) METHOD AND DEVICE FOR QUICKLY MODIFYING THE TORQUE OF AN INTERNAL COMBUSTION ENGINE

(75) Inventors: Hermann Gaessler, Vaihingen (DE); Udo Diehl, Stuggart (DE); Karsten Mischker, Leonberg (DE); Rainer Walter, Pleidelsheim (DE); Bernd Rosenau, Tamm (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 10/026,014

(22) Filed: Dec. 20, 2001

(65) Prior Publication Data

US 2002/0092500 A1 Jul. 18, 2002

(30) Foreign Application Priority Data

Dec. 22, 2000 (DE) .......................................... 100 64 652

(51) Int. Cl.$^7$ .................................................. F01L 1/34
(52) U.S. Cl. ..................... 123/435; 123/90.11; 123/436; 123/345; 123/347
(58) Field of Search ............................... 123/321, 322, 123/345, 347, 435, 436, 90.11, 90.15

(56) References Cited

U.S. PATENT DOCUMENTS 6,553,964 B2 * 4/2003 Arai et al. ................... 123/399
6,561,145 B1 * 5/2003 Stockhausen et al. ..... 123/90.15

* cited by examiner

Primary Examiner—Tony M. Argenbright
Assistant Examiner—Hari H. Huynh
(74) Attorney, Agent, or Firm—Kenyon & Kenyon

(57) ABSTRACT

A method and a device for modifying a torque of an internal combustion engine including at least one first cylinder with an exhaust valve including a variable valve control, in which it is determined whether there is a demand for modifying the torque within a first working cycle of the at least one mfirst cylinder, and the basic triggering of the exhaust valve of the first cylinder is modified in the first working cycle when it is determined that it is necessary to modify the torque during the first working cycle.

22 Claims, 5 Drawing Sheets

(AÖ) Exhaust Value Opening (°crank angle after TDC)

(AÖ) Exhaust Value Opening (°crank angle after TDC)

US 6,651,624 B2

METHOD AND DEVICE FOR QUICKLY MODIFYING THE TORQUE OF AN INTERNAL COMBUSTION ENGINE

FIELD OF THE INVENTION

The present invention relates to a method and a device for modifying the torque of an internal combustion engine having at least one first cylinder with an exhaust valve having a variable valve control.

BACKGROUND INFORMATION

Internal combustion engines, in particular for motor vehicles, may operate with one or more camshafts to control the engine valves according to a predetermined stroke sequence, and the stroke sequence may be specified by the mechanical structure of the camshaft. However, a specified stroke sequence may not permit optimal engine performance because different engine operating states in general require different stroke sequences.

In this regard, internal combustion engines having a hydraulic or electromagnetic camless valve drive instead of a rigid mechanical arrangement may constitute an advance in the design of valve controls. In a camless internal combustion engine, the amount of intake air and residual exhaust gas in each cylinder may be controlled by modifying the time of opening and/or closing of the intake and exhaust valves.

For these conventional internal combustion engines, the following control actions may be known for influencing, in a controlled manner, the torque delivered by the internal combustion engine.

First, with spark ignition engines in particular, a filling intervention may be carried out, modifying the gas filling of the cylinder via an electrically controllable throttle valve or a bypass controller. This filling intervention may be designed to be approximately neutral with regard to consumption or exhaust emissions, but the filling intervention may produce only a gradual change in torque and may not permit any change in the torque contribution of the cylinder during an operating cycle after closing the intake valves of the cylinder. Because of the gradual change, it may not be possible to have high quality idling, i.e., constant idling through the filling intervention alone.

The second method is a filling intervention via the intake valves of the corresponding cylinders with variable intake valve control. As in the case of the filling intervention via the electric throttle valve or the bypass controller, this control action may permit a setting which is approximately neutral with regard to consumption and emissions. However, the filling intervention involving the intake valves is also slow and may not allow any change in torque contribution during a working cycle after closing the intake valve of the respective cylinder.

A third method is a firing angle intervention. Firing angle intervention essentially makes it possible to influence the torque contribution of the respective cylinder and thus the torque of the internal combustion engine after the intake valve of the respective cylinder is closed, by making an adjustment, usually by delaying the firing angle. However, modifying the firing angle may have a negative effect on combustion in the cylinder, leading to increased fuel consumption and possibly also greater exhaust emissions. Furthermore, with this firing angle intervention, the adjustment options may be very minor, depending on the combustion method and the operating point of the internal combustion engine because reliable and stable ignition and combustion are necessary for reasons of fuel consumption, exhaust emissions and smooth running. Furthermore, although the firing angle intervention may be comparatively rapid, it may not allow any change in torque contribution during a working cycle after the beginning of combustion in the respective cylinder.

Finally, there may be injection measures through which the quantity of fuel supplied may be varied. This may provide a relatively quick modification in torque of the internal combustion engine, but the change cannot be implemented during ongoing combustion within a working cycle.

The individual combustion processes in the individual cylinders of the internal combustion engine may be subject to cyclic fluctuations in combustion. These cyclic combustion fluctuations may result from stochastic fluctuations in the local composition and kinematics of the individual fuel-air mixtures in the area of the spark plug at the time of ignition and their influences on the formation of the flame core and the duration of the ignition phase. This may result in different contributions of the individual cylinders to the torque of the internal combustion engine. These differences in individual torque contributions may result in out-of-true running of the internal combustion engine and in particular to poor idling quality. Moreover, the differences cause unnecessary fuel consumption and increased exhaust emissions.

Since all the control actions described above are carried out before the start of combustion in the respective cylinder, they may not be suitable for control, in particular for equalization of the individual torque contributions of the individual cylinders. The interventions referred to above may not suitable for compensating for cyclic fluctuations in combustion because they may not respond to changes or influences occurring during combustion within a working cycle, but instead they produce changes in the following working cycle of the following cylinder at the soonest.

SUMMARY OF THE INVENTION

An object of an exemplary embodiment and/or exemplary method of the present invention is to provide a method and a device for rapidly changing the torque of an internal combustion engine having at least one cylinder with an exhaust valve having a variable valve control.

In an exemplary method for modifying the torque of an internal combustion engine having at least one first cylinder with an exhaust valve having a variable valve control according to the present invention, a determination is made as to whether there may be a demand for modifying the torque within a first working cycle of the first cylinder, and if it is determined that it may be necessary to modify the torque during the first working cycle, a basic triggering of the exhaust valve of the first cylinder may be modified in the first working cycle.

A demand determining device for determining whether there may be a demand for modifying the torque within the first working cycle of the first cylinder is provided in a device according to an exemplary embodiment of the present invention, and there is a triggering modifying device that modifies the basic triggering of the exhaust valve of the first cylinder in the first working cycle when the demand determining device determines that the torque should be modified.

An exemplary embodiment and/or exemplary method of the present invention provides a method and/or a device by which the torque contribution of the corresponding cylinder and thus the torque of the internal combustion engine may be modified very quickly, even within the same working cycle of the respective cylinder. In this way it may be possible to achieve high idling quality. Moreover, the exemplary method and exemplary device may minimize or at least reduce any difference between individual torque contributions of individual cylinders, and thus achieve a high quality average pressure equalization of the individual cylinders among one another and a very good constancy of the average torque contribution of successive working cycles in steady-state operation.

Furthermore, the exemplary method and/or the exemplary device according to the present invention may permit a change in torque of an internal combustion engine when it may no longer be possible to perform a filling intervention via the throttle valve or a filling intervention using the intake valves, a firing angle measure or injection measure, in particular when combustion is already underway. On the whole, this may provide engine operation that is improved in both steady-state and non-steady-state operation with regard to target parameters, such as fuel consumption, exhaust emissions and smooth running in particular.

An exemplary embodiment and/or exemplary method of the present invention may permit the basic triggering of the exhaust valves to be modified with regard to at least one of a plurality of opening parameters, in which the plurality of opening parameters includes at least one opening angle of the exhaust valve, one opening lift of the exhaust valve and one opening rate of the exhaust valve, and the control modifying device is designed to modify at least one of the plurality of opening parameters mentioned above. This may provide a simple and flexible way of modifying the torque.

In another exemplary embodiment and/or exemplary method of the present invention, a determination is made on the basis of at least one of a plurality of setpoint values, changes in which may have an effect on the torque delivered by the internal combustion engine, to determine whether there may be a demand for a change in the torque. This may provide a simple determination of the demand of whether or not the torque should be modified within the first working cycle.

In another exemplary embodiment and/or exemplary method of the present invention, the plurality of setpoint values includes instantaneous values and changes in time from a setpoint torque of the internal combustion engine, a setpoint torque of the first cylinder to the torque of the internal combustion engine, an efficiency of the internal combustion engine and an efficiency of the first cylinder. This may provide an accurate determination of whether or not there may be a demand for a change in the torque in the first working cycle because the setpoint torque of the internal combustion engine may be detected by an accelerator pedal position sensor, for example, in a motor vehicle.

In another exemplary embodiment and/or exemplary method of the present invention, the demand for a modification in torque is determined on the basis of at least one of a plurality of internal combustion engine status parameters which are detected by at least one detection device. This may provide a rapid response to changes occurring within the internal combustion engine, such as incomplete combustion in a cylinder, for example.

In another exemplary embodiment and/or exemplary method of the present invention, the plurality of internal combustion engine status parameters includes the position and height of the maximum pressure of the first torque contribution of the first cylinder to the torque of the internal combustion engine, a combustion chamber pressure and a variation of the combustion chamber pressure in the first cylinder. This may provide a direct response to changes in the combustion process in the internal combustion engine because the demand is determined on the basis of internal combustion engine status parameters, which depend directly on the combustion process taking place in the first cylinder during the first working cycle.

In another exemplary embodiment and/or exemplary method of the present invention, the basic triggering is determined by a control device on the basis of at least one firing angle of the first cylinder, a fuel mass and an air mass, which may be supplied to the first cylinder.

Determination of the basic triggering on the basis of the firing angle of the air mass and the fuel mass supplied may provide a precise and accurate determination of the basic triggering of the exhaust valve of the first cylinder.

In another exemplary embodiment and/or exemplary method of the present invention, a first torque contribution of the first cylinder to the torque of the internal combustion engine in the first working cycle of the first cylinder is compared with a second torque contribution of a second cylinder to the torque of the internal combustion engine in a second working cycle of the second cylinder, and a demand for a change in the torque of the internal combustion engine within the first working cycle of the first cylinder is determined when the first torque contribution is not equal to the second torque contribution, and the basic triggering of the exhaust valve of the first cylinder changes in the first working cycle in such a way that the first and second torque contributions are matched, with a beginning of the first working cycle occurring chronologically after a beginning of the second working cycle. This may minimize the difference between the torque contributions of the individual cylinders to the torque of the internal combustion engine. This may provide a high idling quality and a high quality of the average pressure equalization of the cylinders among one another and a good constancy of the average pressure of successive working cycles in steady-state operation. On the whole, this may result in very smooth running, in particular when the internal combustion engine is idling.

In another exemplary embodiment and/or exemplary method of the present invention, the basic triggering of the exhaust valve of the first cylinder is modified regardless of whether or not a demand for a change in the torque of the internal combustion engine has been determined, so that the first torque contribution of the first cylinder to the torque of the internal combustion engine is less than a maximum instantaneous contribution of the first cylinder. Thus, the basic triggering of the exhaust valve is modified, regardless of whether or not there may be a demand for a change in the torque of the internal combustion engine, so that the resulting torque contribution of the cylinder may be lower than the torque contribution of the cylinder that would have been achieved by using the basic triggering, which may aim at the maximum torque contribution. In other words, controlled triggering of the exhaust valve may have a negative effect on the internal engine efficiency. This is referred to as a derivative action. Use of such a derivative action basic setting, i.e., a torque that is reduced in comparison with the normal basic setting, may permit a rapid increase in torque if necessary. This may also provide a further improvement in the smoothness of running and in the idling quality of the internal combustion engine.

DETAILED DESCRIPTION

Although the following description pertains to exemplary embodiments or exemplary methods in which the change in torque or the influence on torque is implemented as an isolated measure, i.e., without any interaction with, for example, a firing angle intervention, a filling intervention or a filling intervention using the intake valve, the present invention is not so limited. Accordingly, the following embodiments could also be carried out in conjunction with other torque-influencing intervention options such as the aforementioned ignition angle intervention, the filling intervention involving the throttle valve and the filling intervention involving the intake valves.

Figure 1:
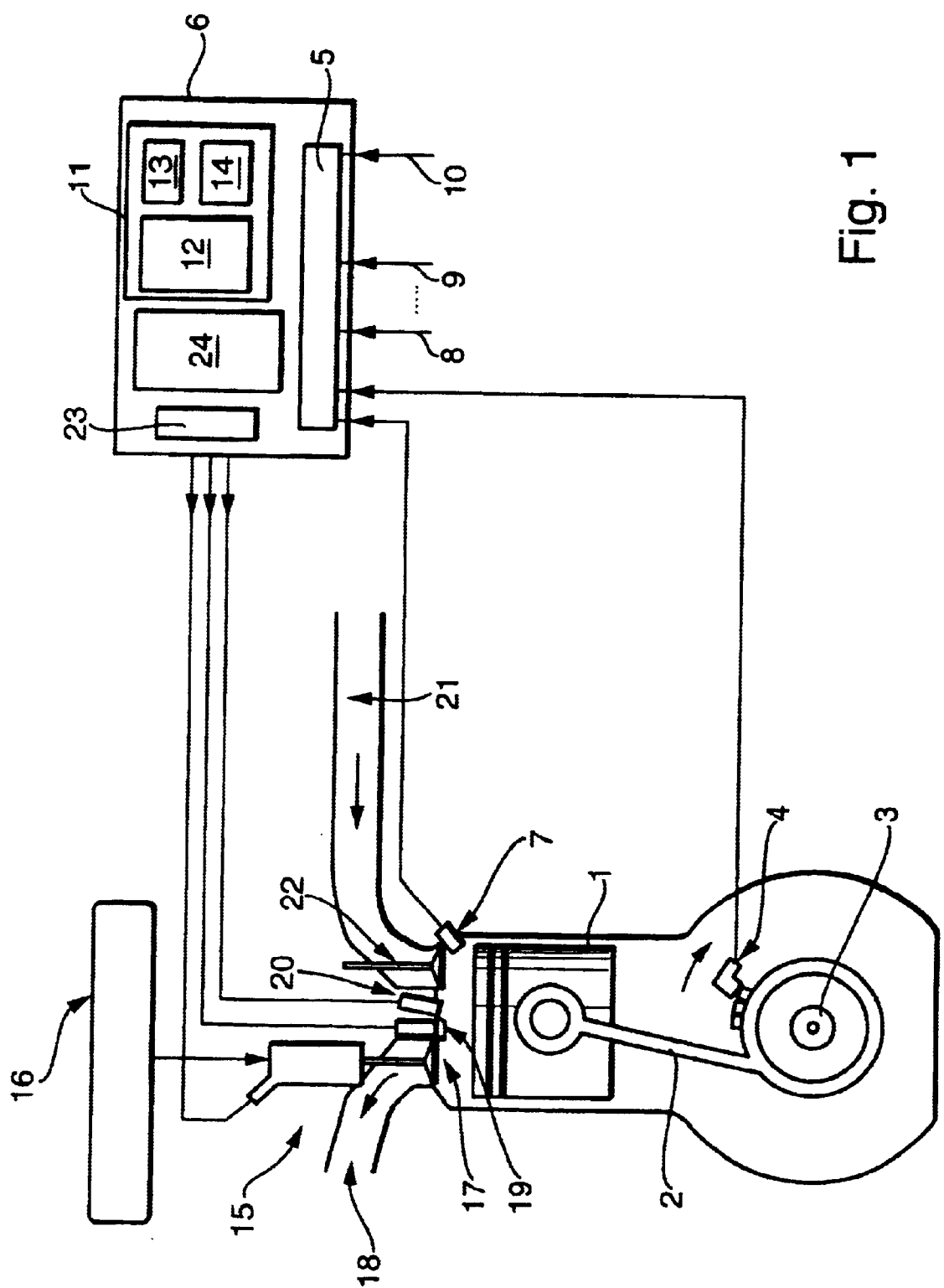
FIG. 1 shows an exemplary embodiment of the present invention.

FIG. 1 shows a first exemplary embodiment of the present invention. A piston 1 is connected to a crankshaft 3 by a piston rod 2. A crank angle sensor 4 detects the position and/or rotational speed of crankshaft 3. Crank angle sensor 4 is connected to a signal receiving device 5 situated in a control unit 6.

A combustion chamber pressure detecting device 7, which may be a combustion chamber pressure sensor, is also connected to signal receiving device 5. An output signal 8 of a detection device (not shown) indicates the position of the accelerator pedal, which is delivered to signal receiving device 5. An output signal 9 of another control unit (not shown) such as a transmission control unit is sent to signal receiving device 5 and relays a request for a quick modification of engine torque.

An output signal 10 of an air mass sensor such as a hot-film air mass sensor is also sent to signal receiving device 5.

Control unit 6 includes an internal combustion engine control unit 11 having a microprocessor 12, a program memory 13 and a data memory 14.

Internal combustion engine control unit 11 determines a basic triggering Ge for an actuator device 15 for adjusting an exhaust valve 17 on the basis of at least one of the detected signal values, e.g., output signal 8 of the accelerator pedal detection device, output signal 9 of the other control unit and output signal 10 of the air mass sensor, each being received by signal receiving device 5. Actuator device 15 for adjusting exhaust valves 17 may be a hydraulically operated gas generator which is connected to an auxiliary energy storage mechanism 16, which may be a common rail. Internal combustion engine control unit 11 outputs control signals for spark plug 19 and a fuel injector 20. An output device 23 receives basic triggering Ge from internal combustion engine control unit 11.

Instead of the hydraulic gas exchange actuator in combination with auxiliary energy storage device 16, a mechanical or electrical gas exchange actuator may be used.

Depending on the position of the valve, exhaust valve 17 of cylinder 1 opens or closes an exhaust port 18 between a combustion chamber of the cylinder and an exhaust.

An intake port 21 of cylinder 1 may be opened or closed by an intake valve 22. Although intake valve 22 is shown in FIG. 1 without a corresponding actuator device, intake valve 22 may have an actuator device comparable to actuator device 15 of exhaust valve 17.

However, intake valve 22 may be operated mechanically, e.g., by a camshaft, whereas exhaust valve 17 is operated by a fully variable actuator device 15 of exhaust valve 17.

Output device 23 delivers a basic triggering Ge of exhaust valve 17, which is determined by internal combustion engine control unit 11, to actuator device 15 of exhaust valve 17, so that exhaust valve 17 may be operated in accordance with basic triggering Ge.

Output device 23 also delivers control signals for spark plug 19 and fuel injector 20, as determined by internal combustion engine control unit 11, to spark plug 19 and fuel injector 20.

A device 24 for modifying the torque of the internal combustion engine is arranged between internal combustion engine control unit 11 and output device 23. The construction of device 24 for modifying the torque of the internal combustion engine will now be described further with reference to FIG. 2.

Figure 2:
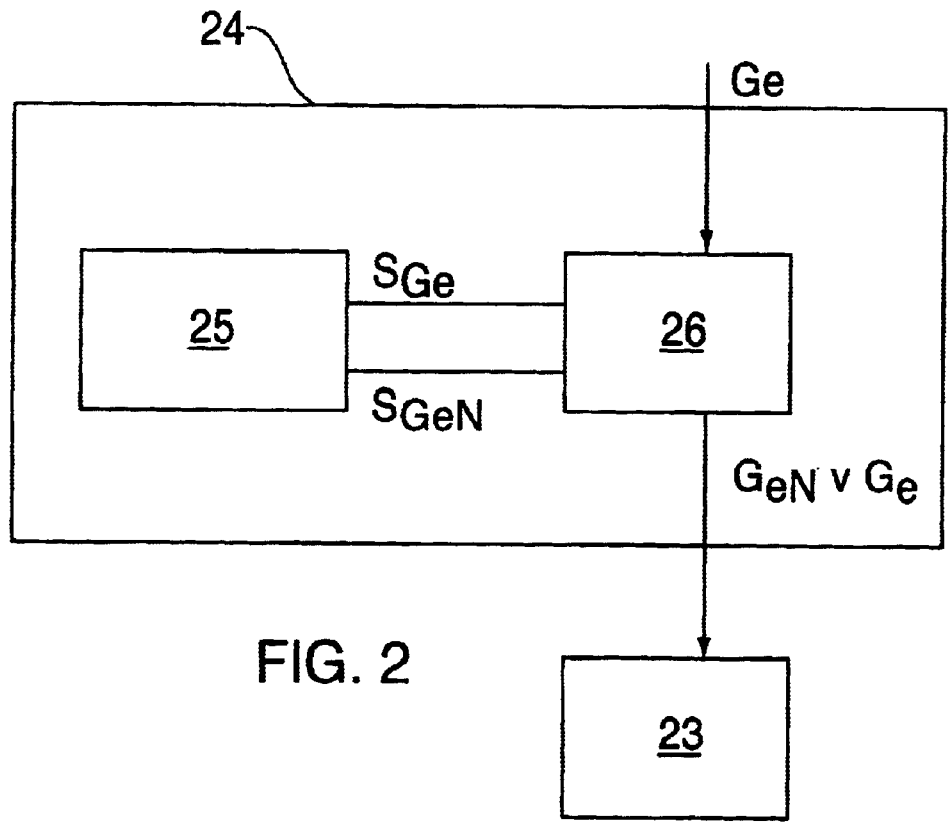
FIG. 2 shows the exemplary embodiment of FIG. 1 in greater detail.

FIG. 2 shows an exemplary embodiment of device 24, shown in FIG. 1, for modifying the torque of an internal combustion engine. Device 24 for modifying the torque of an internal combustion engine includes a demand determining device 25 and a triggering modifying device 26. The output device of FIG. 1 is labeled as 23 in FIG. 2.

Demand determining device 25 determines whether there may be a demand for modifying the torque of the internal combustion engine or the torque contribution of the cylinder within a first working cycle n of cylinder 1. A working cycle is composed of an intake stroke, a compression stroke, a working stroke and an exhaust stroke.

When demand determining device 25 determines that there is a demand for modifying the torque within a working cycle n of cylinder 1, it delivers a first signal $S_{GeN}$ to triggering modifying device 26. If demand determining device 25 determines that there is no demand, it delivers a second signal $S_{Ge}$ to triggering modifying device 26.

Triggering modifying device 26 receives basic triggering Ge, which is determined by internal combustion engine control unit 11. Triggering modifying device 26 relays unchanged basic triggering Ge received by internal combustion engine control unit 11 to output control device 23 when it receives input signal $S_{Ge}$ from demand determining device 25. When triggering modifying device 26 receives a signal $S_{GeN}$, triggering modifying device 26 modifies basic triggering Ge of exhaust valve 17 of cylinder 1 in working cycle n. Triggering modifying device 26 then relays modified basic triggering GeN to output device 23. Output device 23 then outputs appropriate output signals to actuator device 15 of exhaust valve 17, so that exhaust valve 17 opens or closes in accordance with these signals.

Figure 3:
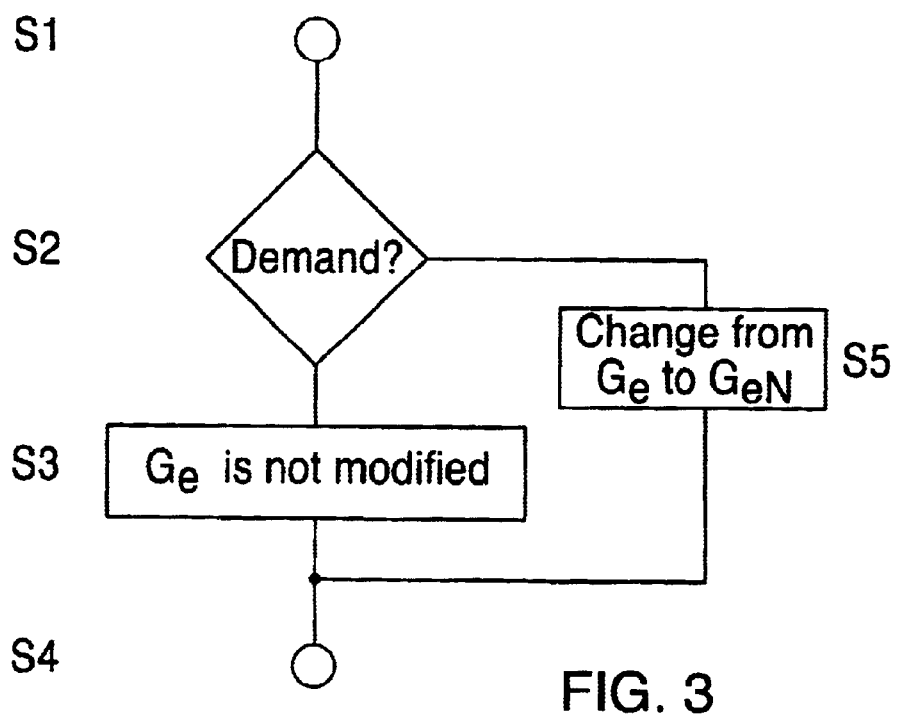
FIG. 3 is a flow chart of a function of the exemplary embodiment of FIG. 1.

FIG. 3 is a flow chart showing an exemplary embodiment of the functioning of device 24 shown in FIG. 2. After the beginning step S1, step S2 determines, by way of demand determining device 25, whether there may be a demand for modifying the torque within first working cycle n of the first cylinder. If it is found in step S2 that there is no demand for modifying the torque, triggering modifying device 26 leaves basic triggering Ge unchanged in step S3 and outputs unchanged basic triggering Ge to output control device 23. This process ends in step S4.

However, if it is found in step S2 that there is a demand for modifying the torque, then in step S5 triggering modifying device 26 modifies basic triggering Ge and outputs modified basic triggering GeN to output device 23. This process ends in step S4.

The processing shown in the block diagram of FIG. 3 is carried out cyclically during operation of the internal combustion engine.

Figure 4:
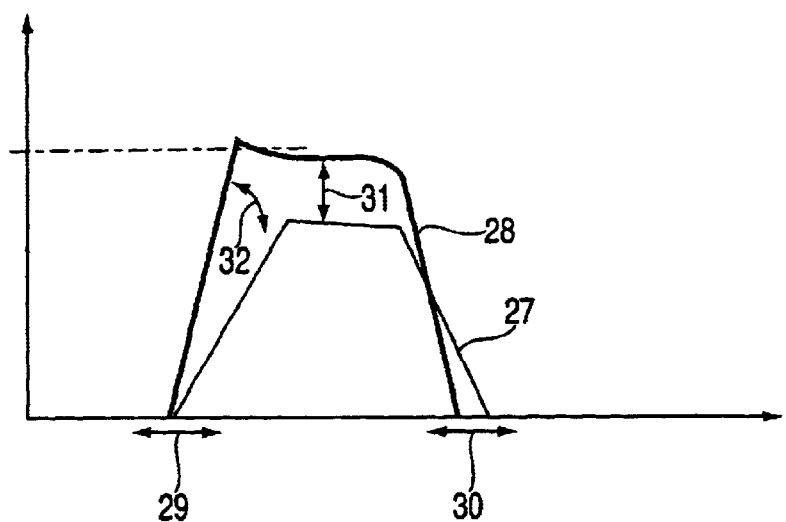
FIG. 4 shows possible settings of a valve lift curve of an exhaust valve.

FIG. 4 is a diagram showing adjustment options for the valve lift curve of exhaust valve 17.

The crank angle is plotted on the x-axis of the diagram of FIG. 4, and the lift of exhaust valve 17 is plotted on the y-axis of the diagram of FIG. 4.

An example of a valve lift curve of exhaust valve 17 according to a basic triggering Ge determined by internal combustion engine control unit 11 is labeled 27. An example of a modified valve lift curve of the exhaust valve according to a modified basic triggering GeN after modification by triggering modifying device 26 (after demand determining device 25 has determined a demand for a change in torque) is labeled 28.

A first change is shown as 29. An opening time of exhaust valve 17 is shifted forward or backward. In the exemplary case shown in FIG. 4, the opening time of exhaust valve 17 has been shifted slightly forward in time.

A second change in basic triggering Ge is labeled as 30. In comparison with basic triggering Ge 27, a closing time, i.e., the time when exhaust valve 17 is closed again, has been shifted forward in time.

A third change is labeled here as 31. In the exemplary case shown in FIG. 4, the opening lift of exhaust valve 17 has been increased in comparison with basic triggering Ge 27.

A fourth change is labeled as 32, denoting a change in the rate of opening and closing of exhaust valve 17. In the exemplary case shown in FIG. 4, in comparison with basic triggering Ge 27, triggering modifying device 26 modified basic triggering Ge 27 so that the rate of opening and closing of exhaust valve 17 increased.

Accordingly, triggering modifying device 26 modifies basic triggering Ge of exhaust valve 17 with regard to at least one of a plurality of opening parameters, the plurality of opening parameters including at least one opening angle of exhaust valve 17, one opening lift of exhaust valve 17 and one opening and closing rate of exhaust valve 17.

Demand determining device 25 of FIG. 2 determines a demand for a modification in torque on the basis of at least one of a plurality of setpoint values, a change in which has an effect on the torque delivered by the internal combustion engine. The plurality of setpoint values may include instantaneous values and/or changes in time from a setpoint torque of the internal combustion engine, a setpoint torque contribution of cylinder 1 to the torque of the internal combustion engine, an efficiency of the internal combustion engine and an efficiency of the first cylinder.

According to an exemplary embodiment and/or exemplary method of the present invention, after determination of the demand to modify the torque of the internal combustion engine within the current working cycle, a valve lift curve of exhaust valve 17 is modified within the current working cycle, so that even after the beginning of the combustion process within the current working cycle, the torque of the internal combustion engine may be modified by modifying the torque contribution of the cylinder. Because of the possibility of rapidly changing the torque of the internal combustion engine, the exemplary embodiment and/or exemplary method of the present invention may be especially suitable for applications in anti-spin regulation, for coordination of shifting operations in an automatic transmission, equalization of torque contributions of individual cylinders to the torque of the internal combustion engine (known as cylinder torque equalization) for cylinder torque equalization in combination with a variable intake valve control, idling regulation and anti-buck damping.

The effect of a change in exhaust valve opening time (or crank angle), referred to below as AÖ, in basic triggering Ge of exhaust valve 17 is described below with reference to FIGS. 5, 6 and 7.

Figure 5:
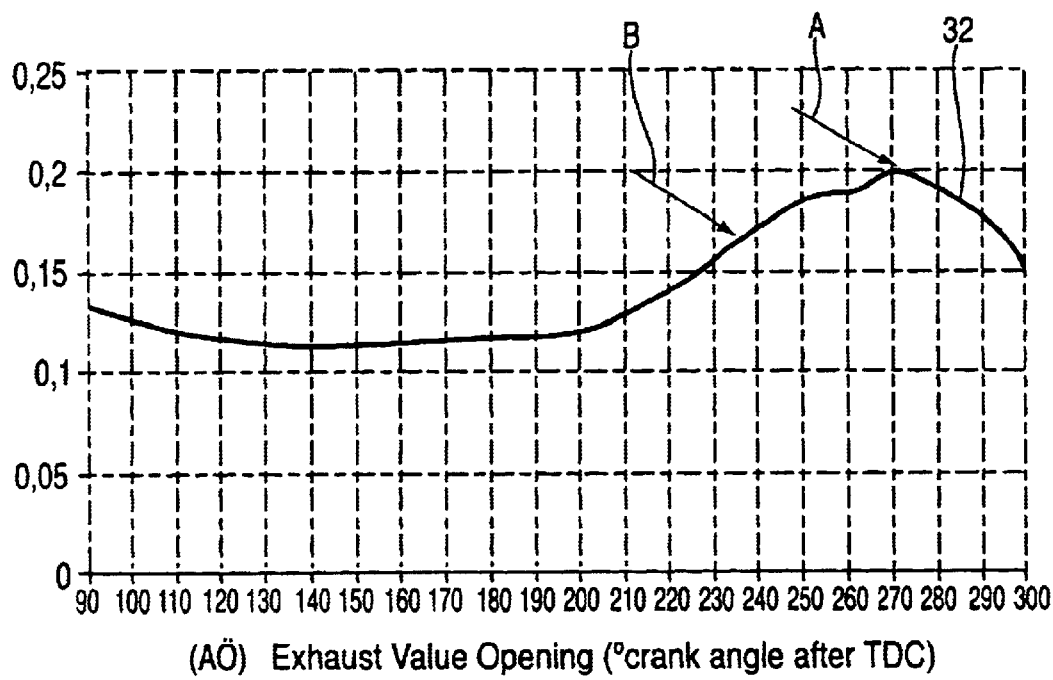
FIG. 5 shows the internal efficiency of an internal combustion engine as a function of the exhaust valve opening time in a low-load operation of the internal combustion engine.
Figure 6:
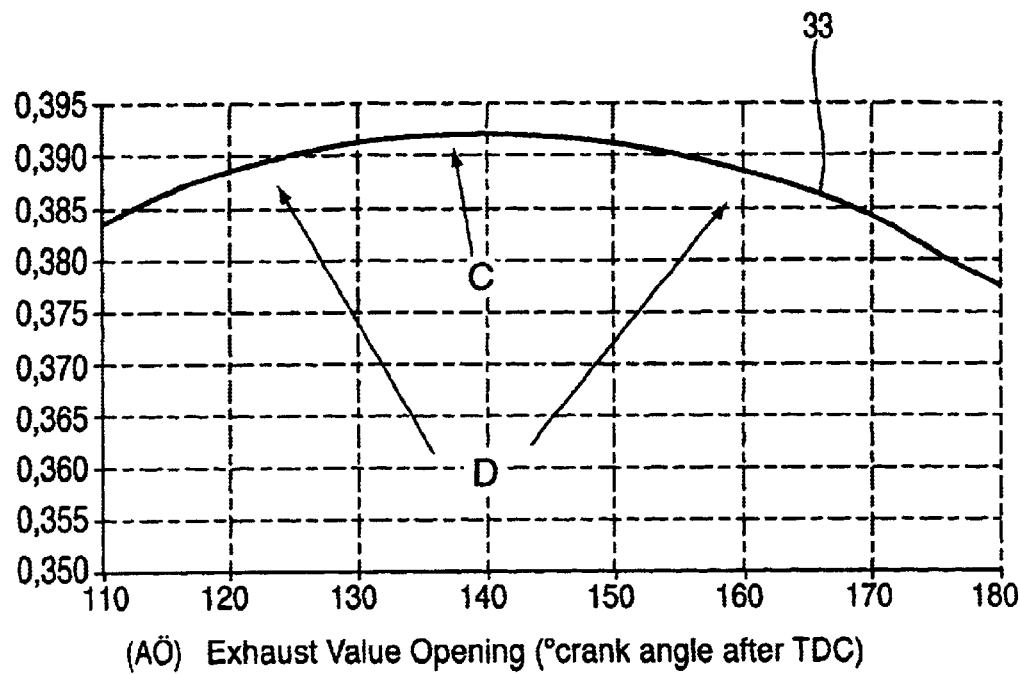
FIG. 6 shows the internal efficiency of an internal combustion engine as a function of the exhaust valve opening time in a high-load operation of the internal combustion engine.

FIGS. 5 and 6 each concern a multi-cylinder internal combustion engine in which the exhaust valves of all cylinders are open at the same AÖ time to illustrate the time effect of different AÖ times. However, the change in AÖ time of just one individual cylinder of an internal combustion engine has the same effect on this individual cylinder as shown in FIGS. 5 and 6 for the entire internal combustion engine, but to a smaller extent.

FIG. 5 is a diagram showing internal efficiency $\eta_{ind}$ of the internal combustion engine as a function of the AÖ time in low-load operation of the internal combustion engine. The A Ö time is plotted on the x-axis of the diagram of FIG. 5 in crank angle units °KW after Top-Dead-Center(TDC) in the compression/ignition stroke. Internal efficiency $\eta_{ind}$ of the internal combustion engine is plotted on the y-axis of the diagram of FIG. 5.

Curve 32 shows internal efficient $\eta_{ind}$ of the internal combustion engine as a function of AÖ time.

As shown in FIG. 5, efficiency remains constant at exhaust valve opening times of 90° crank angle up to approximately 210° crank angle after TDC in the compression/ignition stroke. Thereafter, efficiency increases up to a maximum efficiency at approximately 270° crank angle after TDC in the compression/ignition stroke and then drops again. Arrow A in the diagram of FIG. 5 indicates the maximum efficiency of the internal combustion engine, which may be the exhaust valve opening time calculated by internal combustion engine control unit 11 and sent as basic triggering Ge to output device 23.

If demand determining device 25 determines a demand for a change in torque of the internal combustion engine, then triggering modifying device 26 modifies basic triggering Ge.

When triggering modifying device 26 modifies basic triggering Ge in such a way that the AÖ time of the exhaust valve is shifted forward, the efficiency of the internal combustion engine and thus the torque of the internal combustion engine are reduced. Arrow B indicates an exemplary modified AÖ time.

Assuming that only one AÖ time of a cylinder of a multi-cylinder internal combustion engine is modified, the efficiency of this cylinder will change in the same way as shown in the diagram of FIG. 5. The efficiency and torque of the internal combustion engine also change, but to a lesser extent than indicated in the diagram of FIG. 5 because only the efficiency of one cylinder is reduced, i.e., only one torque contribution of a cylinder of a plurality of cylinders is reduced.

FIG. 6 is a diagram showing the internal efficiency of the internal combustion engine as a function of the AÖ time in high-load operation of the internal combustion engine.

On the x-axis of the diagram of FIG. 6, the AÖ time is plotted in crank angle units of °KW after TDC in the compression/ignition stroke. Internal efficiency $\eta_{ind}$ of the internal combustion engine is plotted on the y-axis of the diagram of FIG. 6. A curve 33 shows internal efficiency $\eta_{ind}$ of the internal combustion engine as a function of the AÖ time of the exhaust valves of the internal combustion engine.

As shown by the diagram of FIG. 6, the efficiency of the internal combustion engine increases from an exhaust valve opening time at 110° crank angle to a maximum at approximately 138° crank angle. The maximum is labeled as C. The internal efficiency drops in the range of approximately 138° crank angle to 180° crank angle.

Arrows D indicate possible AÖ times for reducing efficiency $\eta_{ind}$ and thus the torque of the internal combustion engine. As shown by the diagram in FIG. 6, shifting the exhaust valve opening time around 20° forward to 120° crank angle or 20° backward to 160° crank angle produces approximately the same change in efficiency and thus the same change in torque.

Figure 7:
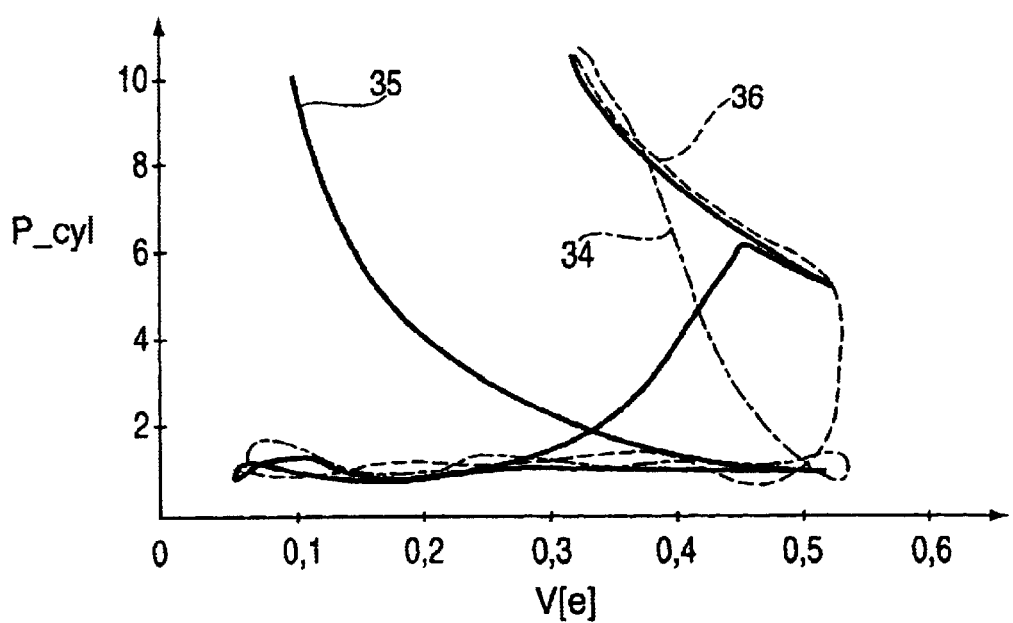
FIG. 7 shows the efficiency of various exhaust valve opening times on a cylinder pressure curve.

FIG. 7 is a diagram showing the effect of different AÖ times on a cylinder pressure curve p as a function of a combustion chamber volume of a cylinder.

Current combustion chamber volume V in liters is plotted on the x-axis of the diagram of FIG. 7 as a function of the piston position in the cylinder. Cylinder pressure p_cyl in bar is plotted on the y-axis of the diagram in FIG. 7.

This volume-pressure diagram shows process loops for an early AÖ time at 100° crank angle after TDC in the compression/ignition stroke of the cylinder, which may be for a AÖ time basic setting located at the highest efficiency, at 160° crank angle after TDC in the compression/ignition stroke and for a latter AÖ time at 230° crank angle after TDC in the compression/ignition stroke for full-load operation of the internal combustion engine. A dash-dot curve 34 plots the process loop for the early AÖ time at 100° crank angle. A dotted line 36 represents the processor loop for the AÖ time at 160° crank angle at which efficiency is almost optimal. A solid line 35 represents the process loop for a late AÖ time at 230° crank angle.

As shown by curve 34 for the process loop for an early A Ö time, a high pressure (much higher than 10 bar, as shown, for example, in FIG. 7) prevails in the cylinder after ignition, dropping almost entirely (to approximately 1 bar, as shown, for example, in FIG. 7) over the course of the working cycle of the cylinder to BDC of the piston characteristic, and maintaining this low pressure during the exhaust stroke.

Curve 36, representing the process loop for an AÖ time of optimal efficiency, shows that after ignition, the pressure in the cylinder may drop more slowly to an average pressure level (approx. 6 bar, as represented, for example, in FIG. 7) than may be the case with an early AÖ time, then dropping rapidly with the opening of the exhaust valve to a low pressure level (approx. 1 bar here, as represented, for example, in FIG. 7) around the Bottom-Dead-Center(BDC) of the piston, where the cylinder volume is greatest. Then this low pressure prevails almost constantly in the cylinder during the exhaust stroke.

Curve 35 represents the process loop for a late AÖ time, indicating that after ignition of the fuel in the cylinder, the pressure behaves the same during the working cycle of the cylinder until BDC as it does with the AÖ time at which efficiency is optimal, whose process loop is labeled as 36. In the following exhaust stroke, the pressure builds up in the cylinder again (while the valves are still closed) until the exhaust valve opens and the pressure drops to the low pressure level, in this example approximately 1 bar. Since the area enclosed by the process loops is a measure of the internal efficiency, the example of FIG. 7 illustrates how the efficiency depends on the exhaust valve opening time illustrated in FIGS. 5 and 6.

FIGS. 5, 6, and 7 show that the torque contribution of individual cylinders and thus of the internal combustion engine may be influenced significantly by a change in AÖ time.

A second exemplary embodiment corresponds in design and function to the first embodiment illustrated in FIG. 1, except that a torque derivative action producing device is provided between internal combustion engine control unit 11 and device 24.

Figure 8:
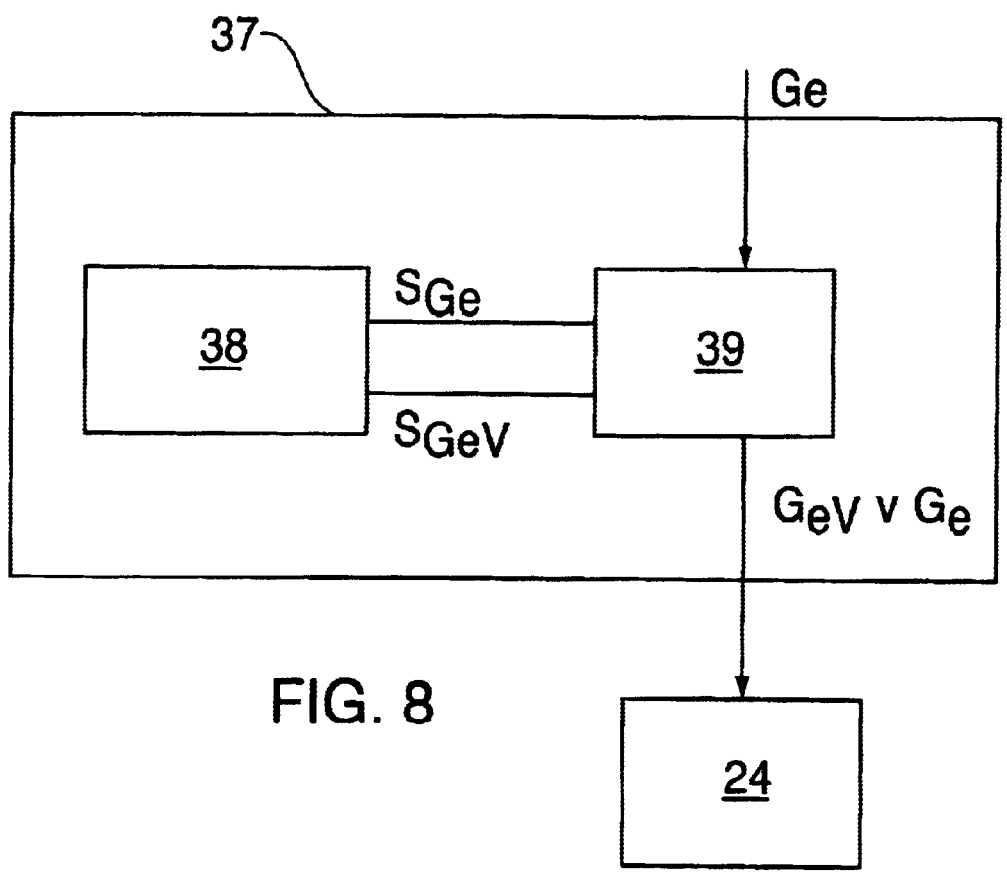
FIG. 8 shows a second exemplary embodiment of the present invention.

FIG. 8 shows an exemplary embodiment of torque derivative action producing device 37. Torque derivative action producing device 37 includes a derivative action demand determining device 38 and a control modifying device 39. Device 24 from FIG. 1 is labeled here as 24.

The function of torque derivative action producing device 37 is to make a change in basic triggering Ge of the exhaust valves of a cylinder 1 on demand so that the resulting torque of the engine or of cylinder 1 may be reduced by a certain amount in comparison with the maximum value that would be possible under otherwise the same operating conditions. This quantity is referred to as the torque derivative action.

Such a torque derivative action differs in several regards from the rapid or short-term changes in torque already described, which are effective in the sense of a rapid correction measure.

First, the torque derivative action may usually be active for a longer period of time, e.g., for the duration of a situation in which it is desirable to induce an increase in torque, even with a quick modification in triggering of the exhaust valves.

Second, such a torque derivative action (in contrast with a rapid torque correction) may usually be taken into account in the higher-level engine control, shown in FIG. 8 as internal combustion engine control unit 11. This may be represented especially as part of available torque-based engine controls. This will be explained in greater detail below.

The purpose of such a torque derivative action, which is determined from time to time, is that a quick modification in torque, specifically an increase in torque, may be achieved as necessary within one working cycle through downstream device 24 for modifying the exhaust valve triggering. The maximum possible increase in torque is determined in FIG. 8 by the magnitude of the derivative action selected. As already stated, such a quick modification in torque or correction may also be achieved by a change in exhaust valve control if no other measure is possible for correction of torque in one working cycle. However, as explained above, without a derivative action, only a reduction in torque would be possible.

If derivative action demand determining device 38 determines that there may be a demand for a torque derivative action in triggering the exhaust valves of a cylinder 1, it delivers a first signal $S_{GeV}$ to control modifying device 39. If derivative action demand determining device 38 determines that there is no demand, it delivers a second signal $S_{Ge}$ to control modifying device 39.

As another input signal, control modifying device 39 receives basic triggering Ge determined by internal combustion engine control unit 11 in FIG. 1. Control modifying device 39 relays unchanged basic triggering Ge received from engine control unit 11 to device 24 when it receives input signal $S_{Ge}$ 35 from demand determining device 37. When control modifying device 39 receives signal $S_{GeV}$, control modifying device 39 modifies basic triggering Ge of exhaust valve 17 of cylinder 1 in working cycle n so that the desired torque derivative action is induced in triggering the exhaust valve. Control modifying device 39 then relays a suitably modified basic triggering GeV to device 24.

Control modifying device 39 modifies basic triggering Ge of exhaust valve 17 with regard to at least one of a plurality of opening parameters in the direction of modified basic triggering GeV, the number of opening parameters including at least one opening angle of exhaust valve 17, one opening lift of exhaust valve 17 and one opening and closing rate of exhaust valve 17. The modification in basic triggering Ge is carried out essentially as in triggering modifying device 26 of FIG. 2 and as described with reference to FIGS. 4, 5, 6 and 7. Control modifying device 39 outputs modified basic triggering GeV on input of signal $S_{GeV}$. When modified basic triggering GeV is used on exhaust valve 17, the torque contribution of respective cylinder 1 based on the working cycle is reduced in comparison with the torque contribution of this cylinder when there is no change in basic triggering Ge, if all other control torque-influencing parameters, such as the fuel mass and firing angle, remain unchanged. Thus, the torque derivative action is created in the control of the exhaust valve.

An exemplary combination is torque derivative action producing device 37 with a design of internal combustion engine control unit 11 as a torque-guided engine control, in which all control parameters of the engine that have an influence on the torque are determined at each point in time so that the torque delivered by the engine is always at the level currently being demanded.

In such a design of torque derivative action producing device 37, at the same time with a modification in basic triggering Ge which brings about the torque derivative action, other measures are also taken, such as increasing the amount of air and fuel or adjusting the firing angle, as a result of which the torque delivered by the engine remains the same. Therefore, in this case, a driver does not notice that a torque derivative action has been achieved or modified—in any case there is no decline in engine power or rpm.

The extent of the modification in basic triggering Ge to GeV is determined by control modifying device 39 on the basis of a desired torque derivative action, the latter being preset or determined in control modifying device 39 as a function of the operating state of the internal combustion engine. Furthermore, control modifying device 39 may determine the extent of the desired torque derivative action as a function of a set priority with regard to consumption or smooth running. When the first priority is smooth running, a larger derivative action may be determined, whereas when the first priority is consumption, a smaller derivative action may be determined.

For these purposes, information regarding the desired contribution of a derivative action and/or the priority with regard to consumption and smooth running and/or regarding instantaneous values of operating quantities of the engine between internal combustion engine control unit 11 and torque derivative action producing device 37 may be exchanged between them without being shown explicitly in FIG. 8.

Derivative action demand determining device 38 determines a demand and delivers signal $S_{GeV}$ when the internal combustion engine is in an operating state in which a short-term increase in the torque contribution of the respective cylinder may be necessary. Derivative action demand determining device 38 determines such an operating state on the basis of internal combustion engine status parameters or quantities derived therefrom. An example of such an operating status is a transition to idling or to a fueled towing operation ("metered engine brake") because as a rule, there may be a demand for quick torque corrections in these operating states to achieve the best and smoothest possible running and to avoid bucking.

Signals Ge and GeV output by torque derivative action producing device 37 are then processed further like signal Ge as described in the first exemplary embodiment. A torque derivative action set with triggering GeV allows execution of an increase in torque quickly through a modification in the triggering of the exhaust valves of the cylinder when a demand for a such a quick modification in the torque contribution of the respective cylinder is determined.

What is claimed is:

1. A method for modifying a torque of an internal combustion engine including at least one first cylinder with an exhaust valve, the exhaust valve including a variable valve control, the method comprising the steps of:
    determining whether there is a demand for modifying the torque of the at least one first cylinder within a first working cycle (n); and
    modifying a basic triggering of the exhaust valve of the at least one first cylinder in the first working cycle when it is determined that there is the demand for modifying the torque within the first working cycle.

2. The method of claim 1, wherein the basic triggering of the exhaust valve is modified based on at least one of a plurality of opening parameters, the plurality of opening parameters including at least one opening angle of the exhaust valve, an opening lift of the exhaust valve, and an opening and closing rate of the exhaust valve.

3. The method of claim 1, wherein the step of determining whether there is the demand for modifying the torque is performed based on at least one of a plurality of preset values, a change in which has an influence on the torque delivered by the internal combustion engine.

4. The method of claim 3, wherein the plurality of preset values includes instantaneous values and changes over time of a setpoint torque of the internal combustion engine, a setpoint torque contribution of the at least one first cylinder to the torque of the internal combustion engine, an efficiency of the internal combustion engine, and an efficiency of the at least one first cylinder.

5. The method of claim 1, wherein the step of determining whether there is the demand for modifying the torque is performed based on at least one of a plurality of internal combustion engine status parameters detected by at least one detection device.

6. The method of claim 5, wherein the plurality of internal combustion engine status parameters includes a torque contribution of the at least one first cylinder to the torque of the internal combustion engine, a combustion chamber pressure, a combustion chamber pressure variation in the at least one first cylinder, and a position and a height of a pressure maximum of a combustion chamber pressure curve of the at least one first cylinder.

7. The method of claim 1, wherein the basic triggering is determined by a control unit as a function of a quantity defining an operating point of the internal combustion engine.

8. The method of claim 7, wherein the one quantity defining the operating point of the internal combustion engine includes at least one of a firing angle of the at least one first cylinder, a fuel mass supplied to the at least one first cylinder, and an air mass supplied to the at least one first cylinder.

9. The method of claim 1, wherein:
the step of determining whether there is the demand for modifying the torque includes comparing a first torque contribution of the at least one first cylinder to the torque of the internal combustion engine in the first working cycle of the at least one first cylinder to a second torque contribution of a second cylinder to the torque of the internal combustion engine in a second working cycle of the second cylinder;
a demand for modifying the torque is determined when the first torque contribution is not equal to the second torque contribution;
the step of modifying the basic triggering includes modifying the basic triggering so that the first torque contribution and the second torque contribution are equalized; and
a beginning of the first working cycle occurs chronologically after a beginning of the second working cycle.

10. The method of claim 1, wherein the step of modifying basic triggering is performed regardless of whether there is the demand for modifying the torque so that a first torque contribution of the at least one first cylinder to the torque of the internal combustion engine is lower than a maximum torque contribution of the at least one first cylinder under otherwise prevailing operating conditions.

11. The method of claim 1, further comprising the steps of:
before determining whether there is the demand for modifying the torque of the at least one first cylinder within the first working cycle, determining whether there is a demand for a torque derivative action of the at least one first cylinder within the first working cycle; and
modifying the basic triggering of the exhaust valve of the at least one first cylinder in the first working cycle when it is determined that there is the demand for the torque derivative action within the first working cycle.

12. A device for modifying a torque of an internal combustion engine including at least one first cylinder with an exhaust valve, the exhaust valve including a variable valve control, the device comprising:
a demand determining device to determine whether there is a demand for modifying the torque of the at least one first cylinder within a first working cycle; and
a triggering modifying device to modify a basic triggering of the exhaust valve of the at least one first cylinder in the first working cycle when it is determined that there is the demand for modifying the torque within the first working cycle.

13. The device of claim 12, wherein the triggering modifying device is operable to modify the basic triggering of the exhaust valve by changing at least one of a plurality of opening parameters, the plurality of opening parameters including at least one opening angle of the exhaust valve, one opening lift of the exhaust valve, and one opening and closing rate of the exhaust valve.

14. The device of claim 12, wherein the demand determining device is operable to determine whether there is the demand for modifying the torque based on at least one of a plurality of preset values, a change in which has an influence on the torque of the internal combustion engine.

15. The device of claim 14, wherein the plurality of preset values includes instantaneous values and changes over time of a setpoint torque of the internal combustion engine, a setpoint torque contribution of the at least one first cylinder to the torque of the internal combustion engine, an efficiency of the internal combustion engine, and an efficiency of the at least one first cylinder.

16. The device of claim 12, wherein the demand determining device is operable to determine whether there is the demand for modifying the torque based on at least one of a plurality of internal combustion engine status parameters detected by at least one detection device.

17. The device of claim 16, wherein the plurality of internal combustion engine status parameters includes a torque contribution of the at least one first cylinder to the torque of the internal combustion engine, a combustion chamber pressure, a combustion chamber pressure variation in the at least one first cylinder, and a position and a height of a pressure maximum of a combustion chamber pressure curve of the at least one first cylinder.

18. The device of claim 12, wherein the triggering modifying device includes a control unit to determine the basic triggering as a function of at least one quantity characterizing an operating point of the internal combustion engine.

19. The device of claim 18, wherein the at least one quantity characterizing the operating point of the internal combustion engine includes at least one of a firing angle of the at least one first cylinder, a fuel mass supplied to the at least one first cylinder, and an air mass supplied to the at least one first cylinder.

20. The device of claim 12, wherein:
the demand determining device is operable to compare a first torque contribution of the at least one first cylinder to the torque of the internal combustion engine in the first working cycle of the at least one first cylinder to a second torque contribution of a second cylinder to the torque of the internal combustion engine in a second working cycle of the second cylinder, and to determine the demand for modifying within the first working cycle when the first torque contribution is not equal to the second torque contribution;
the triggering modifying device is operable to modify the basic triggering of the exhaust valve of the at least one first cylinder in the first working cycle so that the first and second torque contributions are equalized; and
a beginning of the first working cycle occurs chronologically after a beginning of the second working cycle.

21. The device of claim 12, wherein the triggering modifying device is operable to output the basic triggering of the exhaust valve of the at least one first cylinder regardless of whether there is the demand for modifying the torque, so that a first torque contribution of the at least one first cylinder to the torque of the internal combustion engine is lower than a maximum instantaneous contribution of the at least one first cylinder under otherwise prevailing operating conditions.

22. The device of claim 12, wherein the demand determining device is operable to determine whether there is a demand for a torque derivative action of the at least one first cylinder within the first working cycle, and the triggering modifying device is operable to modify the basic triggering of the exhaust valve of the at least one first cylinder in the first working cycle when the demand determining device determines that there is the demand for the torque derivative action within the first working cycle.

* * * * *